March 11, 1969 W. J. CRAIG 3,432,069
CLOSURE CONSTRUCTION
Filed Oct. 11, 1967
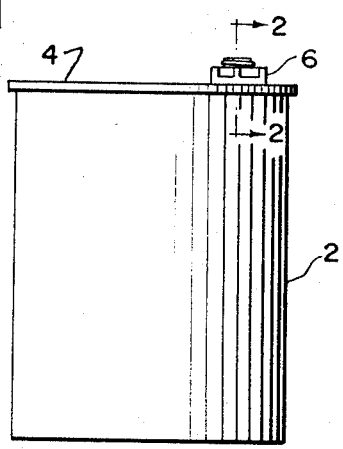
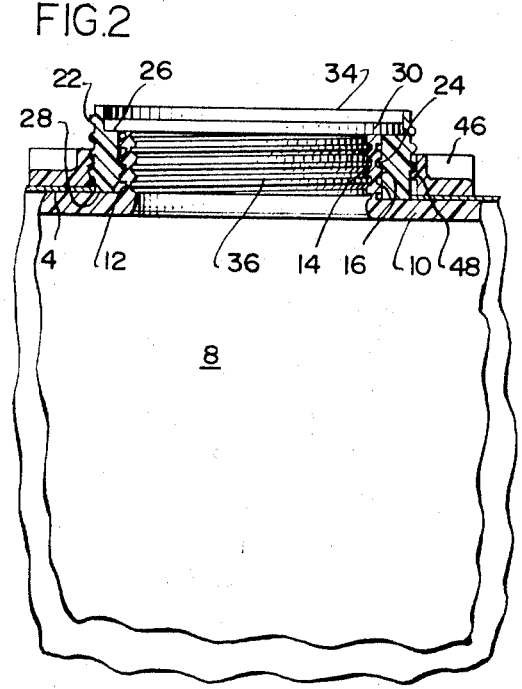
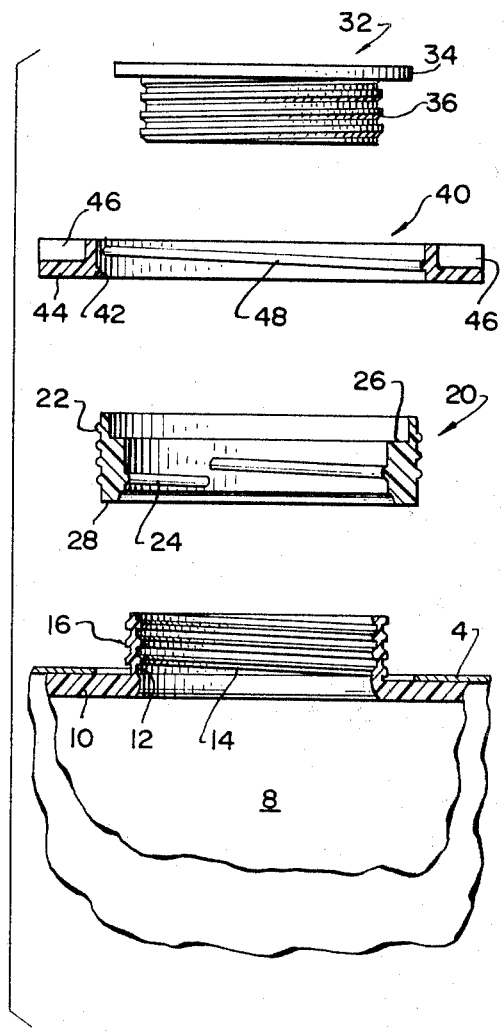
INVENTOR.
WALTER J. CRAIG
BY *Petherbridge, O'Neill & Aubel*
ATTORNEYS.

United States Patent Office 3,432,069
Patented Mar. 11, 1969

3,432,069
CLOSURE CONSTRUCTION
Walter J. Craig, Prospect Heights, Ill., assignor to K and M Rubber Company, Elk Grove Village, Ill., a corporation of Illinois
Filed Oct. 11, 1967, Ser. No. 674,402
U.S. Cl. 220—63
Int. Cl. B65d 25/44, 25/34
4 Claims

ABSTRACT OF THE DISCLOSURE

A closure construction for a molded plastic container designed to facilitate the installation and maintenance of the container within a storage drum fabricated from a common material such as plastic, metal, fiber or composite. The closure construction includes a container with an integrally molded threaded neck portion, a collar threaded over the neck portion, a plug threaded into the neck portion of the container and a second collar member threaded over the first collar and into engagement with the top or lid portion of the drum to maintain the position of the neck with respect to the exterior of the drum.

---

The present invention is concerned with an improvement in the closure construction utilized in large capacity molded plastic containers. It is a common practice in the fabrication of large capacity thermoplastic containers to utilize a blow-molding process. This process is capable of economically mass producing such containers. However, in blow-molding processes, one of the inherent advantages, namely, the production of light-weight, thin-walled containers utilizing a minimum of material, gives rise to an inherent disadvantage, namely, the formation of a container with relatively little intrinsic structural strength. For this reason, these containers are most frequently used as liners for rigid container structures such as drums, barrels, casks, etc.

While rigid container structure provides the essential strength for supporting the body of a plastic liner-type container, it fails to impart additional strength or support to the closure structure of the plastic container. The neck of the closure structure of such plastic containers is ordinarily molded integrally with the body of the container. And, while the wall thickness of the neck portion of the container closure is greater than the remainder of the body portion, it generally does not develop sufficient rigidity and strength to be safely usable alone with a conventional cap or plug element.

Numerous attempts have been made to improve the neck portion of molded plastic containers since this portion forms the basic element of container closure structures. One such attempt is set forth in applicant's prior United States Patent 3,173,569.

The closure construction of the invention utilizes a collar member preferably fabricated from a plastic material, although other materials may be employed, to reinforce the protruding neck portion in a manner permitting the rigid substantially fluid-tight coupling of a plug or other suitable cap to the neck. The plastic collar is provided with an internal thread which permits threading of the collar over the neck and into engagement with the container surface bordering the protruding neck. The collar is, therefore, firmly threaded onto the container neck and is removable therefrom. This overcomes the disadvantages of prior structures utilizing snap-on fits of supporting structures, jam fits, and the like, where gripping projections formed on the neck portion of the plastic container could be damaged, completely sheared off or jammed with respect to the collar in a manner such that the gripping projection could be worn away by the tightening of a cap or other accessory thereover. When damage of this nature occurred to such closures, it was no longer possible to secure reinforcing collars to the necks thereof and it became necessary to discard the entire container. With the closure construction of the present invention, however, the cooperable threading feature of the collar and neck will avoid such damage and permit the replacement of collars when desired.

The accessory flange collar of the subject closure construction, which is threaded over the collar member of the construction, serves to maintain the closure structure in predetermined relationship with respect to the cover of the drum or container in which the plastic container is positioned. This prevents the closure and particularly the neck of plastic container from being drawn into the drum by the partial collapse of the walls of the thin-walled plastic container.

Various objects and advantages of the invention will hereinafter become more fully apparent from the following description of the drawings illustrating presently preferred embodiments hereof and wherein:

FIGURE 1 is a side elevation of a drum with the closure of the invention projecting therefrom;

FIGURE 2 is a partial sectional view of the closure of the invention; and

FIGURE 3 is an exploded view of the closure of FIGURE 2 illustrating the elements thereof in section.

Referring now to FIGURE 1, a rigid tank or drum, generally designated 2, and having a removable cover or lid 4 is shown with the closure construction, generally designated 6, of the invention projecting above the removable lid 4.

The plastic container of the invention, generally designated 8, is ordinarily fabricated with a relatively thin wall section. Since the holding capacity of the container 8 is comparatively large, it is generally necessary to use the container in conjunction with a rigid supporting structure such as tank or drum 2 to prevent rupture of the container. The container 8, therefore, is ordinarily used as a liner for tanks, drums, boxes, cartons and the like and is considered in such environment below. The closure 6, however, could be employed with a free-standing container.

While the plastic container 8, as shown in FIGURE 2, generally has a relatively thin wall section except for top wall portion 10 where the wall thickness of the plastic container is of a thickened cross-section adjacent the neck 12 projecting therefrom. As is shown in FIGURES 2 and 3, the neck 12 of the plastic container projects upwardly from the top wall portion 10 thereof at an angle generally perpendicular to the top wall portion. The resulting configuration of the neck 12, therefore, generally defines a cylinder. The internal and external peripheries of the neck 12 are provided with a continuous internal thread 14 and a continuous external thread 16, respectively.

Referring particularly to the detailed exploded view of FIGURE 3, the collar member of the invention is generally designated 20. This collar member 20 defines a generally cylindrical body which is provided with a continuous external peripheral thread 22 and an internal peripheral thread 24 which describes a single revolution about the internal periphery thereof. To top portion of collar 20 is internally counterbored to provide a horizontal gasket seating surface 26.

Collar member 20 is to be threaded onto and over neck portion 12 and thread 16 thereof as shown in FIGURE 2. The threading of the collar member over the neck portion is continued until the generally horizontal bottom edge 28 of collar member 20 bottoms on the top wall portion 10 of container 8 and gasket seat 26 becomes aligned in generally flush relationship with the top edge of neck 12.

A suitable resilient annular gasket 30, as shown in FIGURE 2, is positioned on gasket seat 26 and overlaps the top edge of neck 12. A plug element, generally designated 32 and having a flange sealing cover 34 and a depending threaded body portion 36, is threaded internally into the neck portion 12 and thread 14 thereof until the flange cover portion 34 of the plug member 32 is brought into compressive engagement with the resilient gasket 30, as shown in FIGURE 2 to provide a fluid-tight seal of the closure 6. The neck 12, with the assistance of collar member 20, is rigidly supported and reinforced against outward deflection, deformation of rupture as the plug 32 is threaded into the neck and subsequently when the plug is in sealed relationship with respect to the gasket. This provides an exceptionally sturdy and reliable closure structure which will serve effectively and efficiently whether the container is full, partially full or completely empty.

An accessory flange collar, generally designated 40, as shown in FIGURES 2 and 3, consists of a generally cylindrical body portion 42 and a horizontal flange portion 44 projecting radially therefrom. The periphery of the flange collar 40 between the exterior walls defining the cylindrical body 42 and the radial flange 44 is provided with a plurality of spaced tabs 46 which serve to provide a gripping surface for rotation and tightening of the flange collar. As is best seen in FIGURE 3, the flange collar is provided with an integrally-formed continuous thread 48 which complements and is co-operable with the thread 22 on the collar member 20. The flange collar may therefore be threaded over the collar member 20 in telescoping relationship therewith.

As can be best seen in FIGURE 2, the flange collar 40 is threaded onto collar member 20 and into compressive engagement with the lid or cover portion 4 of the tank or drum 2. Continued threading of the flange collar urges the top wall portion 10 of the plastic container upwardly and into engagement with the under side of lid 4 while the flange collar 40 compressively engages the top surface of lid 4. This thereby serves to maintain the closure construction in a position where it continuously projects from the tank or drum in which the container 8 is installed. Due to the thin gauge of the walls of the container, without the use of a flange collar 40, it is otherwise possible, when emptying the container, to produce a partial vacuum within the container causing the partial inward collapse of the container walls. This, in turn, can cause the entire closure portion 6 thereof to be drawn into the rigid container 2 completely below cover 4. This necessitates the removal of the lid 4 to further withdraw the contents from the container.

Various modes of carrying out the invention are contemplated as being within the scope of the following claims particularly pointing out and distinctly claiming the subject matter which is regarded as the invention.

I claim:

1. A closure construction for a plastic container having an opening comprising a hollow neck portion bordering the container opening projecting thereabove, and formed integrally with a wall of the container, the hollow neck portion being formed with axially extending continuous internal threads, a plug threaded into the internal threads of the neck portion and removably threaded therein for selectively opening and closing the container opening, the plug being formed with a configuration complementing the interior configuration of the neck portion for tight-fitting threaded engagement therewith, the external periphery of the neck portion having a generally cylindrical configuration and being continuously threaded, a hollow collar member having an internally threaded portion and threaded onto and in telescoping relation with the neck portion of the container, the internally threaded portion of the hollow collar portion being formed with an integral thread substantially completing a single turn around the internal periphery thereof to permit the collar to be threaded down over the neck portion until the bottom edge of the collar is brought into firm engagement with the outer container wall bordering the integral neck portion, the hollow collar member being formed with a generally cylindrical internal configuration complementing the external peripheral of the projecting neck portion for close fitting supporting engagement therewith, the hollow collar member serving to reinforce and support the neck portion to prevent expansion and deflection thereof when the container is in a filled condition and the plug is threaded into the neck portion thereof to close the container.

2. The closure construction of claim 1 wherein the upper portion of the hollow collar member is provided with a generally cylindrical upwardly opening counterbore, the counterbore being disposed to act cooperably with the upper edge of the neck portion to provide a seat for a sealing gasket, a generally annular gasket disposed on the seat and means on the plug engageable with the gasket to provide a fluid-tight seal when the plug is inserted in the neck portion of the container.

3. The closure construction of claim 1 wherein means are provided on the collar member for securement of a flange collar member thereto including thread means and cooperable thread means provided on the flange collar member permitting the flange collar member to be threaded over the collar member to a point adjacent the surface of the container bordering the neck portion.

4. The closure construction of claim 3 wherein the container is disposed in a rigid supporting container, the rigid supporting container is provided with an opening through which the neck portion of the container projects, the flange collar member is threaded over the collar member and into engagement with the outer surface of the rigid supporting container to maintain the position of the container neck portion with respect to the rigid supporting container opening.

References Cited

UNITED STATES PATENTS

| 3,167,210 | 1/1965 | Carney | 220—63 |
| 3,337,083 | 8/1967 | Godshalk | 220—39 |

GEORGE T. HALL Primary Examiner.

U.S. Cl. X.R.

220—39